(12) United States Patent
Kroupenkine et al.

(10) Patent No.: US 6,829,415 B2
(45) Date of Patent: Dec. 7, 2004

(54) OPTICAL WAVEGUIDE DEVICES WITH ELECTRO-WETTING ACTUATION

(75) Inventors: Timofei Nikita Kroupenkine, Warren, NJ (US); Peter Mach, Coon Rapids, MN (US); John A. Rogers, New Providence, NJ (US); Shu Yang, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 153 days.

(21) Appl. No.: 10/231,614

(22) Filed: Aug. 30, 2002

(65) Prior Publication Data

US 2004/0042721 A1 Mar. 4, 2004

(51) Int. Cl.[7] .................................................. G02B 6/34
(52) U.S. Cl. .......................................... 385/37; 385/13
(58) Field of Search ............................. 385/10, 13, 37, 385/123–125

(56) References Cited

U.S. PATENT DOCUMENTS

| | | | |
|---|---|---|---|
| 3,670,130 A | 6/1972 | Greenwood et al. | 200/183 |
| 4,030,813 A | 6/1977 | Kohashi et al. | 350/161 |
| 4,118,270 A | 10/1978 | Pan et al. | 156/659 |
| 4,137,060 A | 1/1979 | Timmermann | 65/31 |
| 4,338,352 A | 7/1982 | Bear et al. | 427/8 |
| 4,406,732 A | 9/1983 | Kayoun | 156/626 |
| 4,569,575 A | 2/1986 | Le Pesant et al. | 350/355 |
| 4,653,847 A | 3/1987 | Berg et al. | 350/96.2 |
| 4,671,609 A | 6/1987 | Khoe et al. | 350/96.18 |
| 4,708,426 A | 11/1987 | Khoe | 350/96.18 |
| 4,867,521 A | 9/1989 | Mallinson | 350/96.18 |
| 4,948,214 A | 8/1990 | Hamblen | 350/413 |
| 5,412,746 A | 5/1995 | Rossberg et al. | 385/48 |
| 5,486,337 A | 1/1996 | Ohkawa | 422/100 |
| 5,518,863 A | 5/1996 | Pawluczyk | 430/321 |
| 5,659,330 A | 8/1997 | Sheridon | 345/84 |
| 6,014,259 A | 1/2000 | Wohlstadter | 359/619 |
| 6,369,954 B1 | 4/2002 | Berge et al. | 359/668 |
| 6,538,823 B2 | 3/2003 | Kroupenkine et al. | 359/665 |
| 6,545,815 B2 | 4/2003 | Kroupenkine et al. | 359/665 |
| 6,545,816 B1 | 4/2003 | Kroupenkine et al. | 359/665 |
| 6,665,127 B2 | 12/2003 | Bao et al. | 359/254.99 |
| 6,674,940 B2 | 1/2004 | Kroupenkine | 385/33 |
| 2002/0154860 A1 * | 10/2002 | Fernald et al. | 385/37 |

OTHER PUBLICATIONS

Abbott, N.L., Whitesides, G.M., *Potential–Dependent Wetting of Aqueous Solutions on Self–Assembled Monolayers Formed from 15–(Ferrocenylcarbonyl) pentadecanethiol on Gold*, Langmuir, vol. 10, No. 5, 1994, pp. 1493–1497.
U.S. patent application Ser. No. 10/139,124, Kroupenkine et al., filed May 3, 2002.
U.S. patent application Ser. No. 10/231.614, Kroupenkine et al., filed Aug. 30, 2002.
U.S. patent application Ser. No. 10/637,837, Davis et al., filed Aug. 8, 2003.
U.S. patent application Ser. No. 10/094,093, Eggleton et al., filed Mar. 8, 2002.

* cited by examiner

*Primary Examiner*—Phan T. H. Palmer

(57) ABSTRACT

A tunable optical waveguide is enclosed in an enclosure containing a controllably moveable region of fluid with a refractive index greater than the optical fiber such that at least a first transmission property of the waveguide is modified when the region of fluid is moved. In a first embodiment, the optical device comprises a Bragg grating that is tuned by moving the fluid over the grating to vary the amplitude of desired wavelengths that are reflected back through the core of the fiber. In a second embodiment, the optical device comprises a long-period grating that is tuned by moving the fluid over the grating to vary the amplitude of desired wavelengths that are transferred into the cladding of the fiber and, as a result, to decrease the amplitude of those desired wavelengths that are transmitted through the core of the fiber.

7 Claims, 9 Drawing Sheets

OPTICAL WAVEGUIDE DEVICES WITH ELECTRO-WETTING ACTUATION

FIELD OF THE INVENTION

The present invention relates to optical waveguide devices and, in particular, to optical waveguides tunable by electrowetting actuation of fluids in proximity to those devices.

BACKGROUND OF THE INVENTION

Optical fibers are useful for many applications in modern communications systems. A typical optical communications system comprises a transmitter of optical signals (e.g., a laser-based transmitter that generates a desirable wavelength of light, such as 1550 nm), a length of transmission optical fiber coupled to the source, and a receiver coupled to the fiber for receiving the signals. Optical fiber useful in such systems typically comprises a strand of wave-guiding glass with an inner core region and an outer cladding region that surrounds the core. As long as the refractive index of the core exceeds that of the cladding, a light beam can be guided along the length of the core by total internal reflection. One or more amplifying systems may be disposed along the fiber for amplifying the transmitted signal.

Filters and attenuators, such as those comprising an optical fiber grating, are required in these systems to change the power levels and characteristics of various signals or portions of signals propagating through an optical fiber. An optical fiber grating typically comprises a length of fiber including a plurality of optical grating elements such as index of refraction perturbations, slits or grooves. These elements may or may not be substantially equally spaced. Illustrative examples of such gratings include Bragg gratings and long-period gratings.

A fiber Bragg grating comprises a length of optical fiber including a plurality of perturbations in the index of refraction. These perturbations selectively reflect light of wavelength λ equal to twice the distance Λ' between successive perturbations times the effective refractive index, i.e.:

$$\lambda_R = 2n_{\it{eff-core}} \Lambda \quad \text{(Equation 1)}$$

where $\lambda_R$ is the vacuum wavelength and $n_{\it{eff-core}}$ is the effective refractive index of the propagating mode. The remaining wavelengths pass through the grating essentially unimpeded. Bragg gratings have found use in a variety of applications including filtering, adding and dropping signal channels, stabilization of semiconductor lasers, reflection of fiber amplifier pump energy, and compensation for waveguide dispersion.

A long period grating couples optical power between two copropagating modes with very low back reflections. It typically comprises a length of optical waveguide wherein the refractive index perturbations are spaced by a periodic distance Λ that is large compared to the wavelength λ of the transmitted light. In contrast with Bragg gratings, long-period gratings use a periodic distance Λ which is typically at least 10 times larger than the transmitted wavelength, i.e., Λ≧10λ. Typically Λ is in the range of 15~1500 micrometers, and the width of a perturbation is in the range of ⅕ Λ to ⅘ Λ. In some applications, such as chirped gratings, the spacing Λ can vary along the length of the grating. Long-period gratings are particularly useful in optical communication systems for equalizing amplifier gain at different wavelengths. See, for example, U.S. Pat. No. 5,430,817 issued to A. M. Vengsarkar on Jul. 4, 1995.

Many potential applications require optical gratings wherein light propagation behavior through the grating is tunable. A tunable long period grating, for example, can provide dynamic gain compensation. On the other hand, a tunable Bragg grating can permit dynamic control over which wavelength will pass through the grating and which will be reflected or diverted. While this tunability is desired, light is confined mostly in the core region of an optical fiber and, therefore, the ability to externally effect propagation behavior of the light is significantly limited. With conventional fibers, one is essentially limited to the application of strain and/or temperature changes to the fiber to change the propagation behavior of light in the core. Alternatively, specially designed microstructured fibers have been developed whereby small quantities of fluid are pumped into channels disposed within the structure of the fiber itself. Such fibers are the subject of copending U.S. patent application Ser. No. 10/094,093, entitled "Tunable Microfluidic Optical Fiber Devices And Systems," which is hereby incorporated by reference herein. While prior tunable optical devices are acceptable for many uses, they tend to be limited in their effect on light propagation behavior and can be expensive to manufacture.

As optical communications systems become more advanced, there is a growing need for new, cost-effective tunable optical devices and methods of using those devices for changing the propagation behavior of light signals through optical waveguides.

SUMMARY OF THE INVENTION

A tunable optical waveguide device is enclosed in an enclosure containing a region of fluid with a refractive index different than the optical waveguide. The region of fluid is controllably moved within the enclosure to modify at least a first transmission property of the device in the region to which or from which the fluid is moved in order to variably attenuate the wavelengths of the signal transmitted through the waveguide. In a first embodiment, the optical waveguide device comprises an optical fiber long-period grating that is tuned by moving the fluid over the grating to vary the amplitude of desired wavelengths that are transferred into the cladding of the fiber and, as a result, to decrease the amplitude of those desired wavelengths that are transmitted through the core of the fiber. In a second embodiment, the optical waveguide device comprises an optical fiber Bragg grating that is tuned by moving the fluid over the grating to vary the amplitude of desired wavelengths that are reflected back through the core of the fiber.

DETAILED DESCRIPTION OF THE INVENTION

Figure 1A:
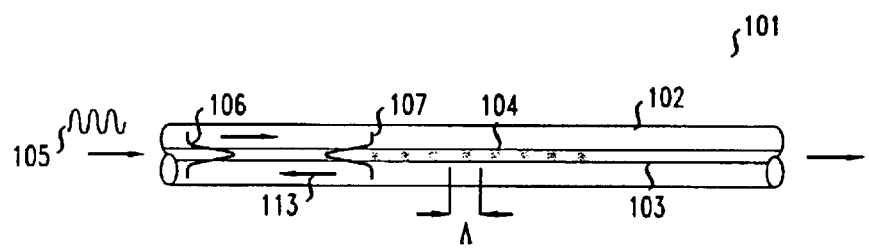
FIG. 1A shows a conventional prior art fiber with a Bragg grating.
Figure 1B:
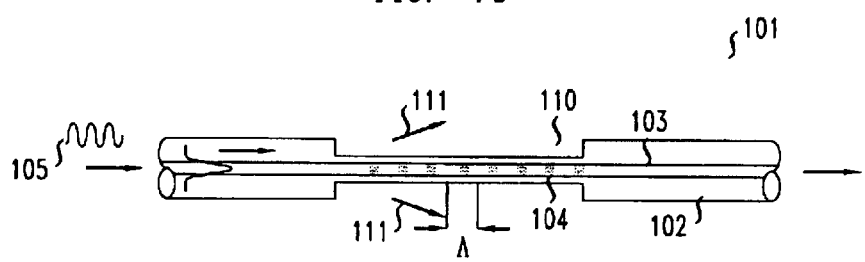
FIG. 1B shows the fiber of FIG. 1A wherein a portion of the cladding corresponding to the Bragg grating has been etched away.
Figure 1C:
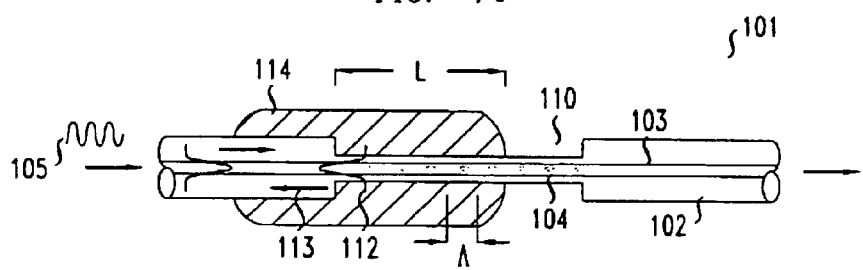
FIG. 1C shows the fiber of FIG. 1B wherein a liquid is moved over the exposed core such that it overlaps with the core.

As illustrated in FIGS. 1A, 1B, and 1C, the inventors have discovered that tunable optical fiber devices may be created by moving a liquid over an active region of a fiber, such as a Bragg grating (or, alternatively, a long-period grating, a planar waveguide or other device). FIG. 1A shows a conventional prior art fiber 101 with core 103, cladding 102 (with a refractive index greater than the refractive index of the core), and Bragg grating 104 having a constant period Λ, which is typically approximately 0.5 μm. Light 105 propagates through fiber 101 with an amplitude represented by curve 106. When the light encounters the Bragg grating 104, a specific wavelength of amplitude represented by curve 107 is reflected back through the fiber 101 in direction 113. The reflected wavelength $\lambda_R$ is defined in Equation 1 above where $n_{core-eff}$ is the effective refractive index of the core of the fiber (which depends upon the refractive index of the core and the refractive index of the cladding) and Λ is the period of the grating.

FIG. 1B shows the fiber 101 of FIG. 1A wherein a portion 110 of the cladding 102, corresponding to the Bragg grating 104 has been etched away (i.e., is uncladded), exposing the core 103. As before, light 105 with amplitude 106 propagates along fiber 101. In this case, however, since the cladding 102 has been removed, the refractive index of the core 103 exceeds that of the cladding 102 and, as a result, a substantial portion of the light 105 of amplitude 106 traveling through the fiber 101 exits the core and propagates into the surrounding medium, as represented by arrows 111.

FIG. 1C illustrates the principles of the present invention and shows the fiber of FIG. 1B wherein a liquid 114 with a refractive index greater than the core 103 is moved over the exposed core such that it overlaps with the core. In this case, when the light 105 of amplitude 106 encounters the Bragg grating it remains in the core due to the higher refractive index of the liquid 114 relative to the core 103. As such, wavelength $\lambda_R$, determined by Equation 1, is reflected back through the core 103 in direction 113. The amplitude of the reflected wavelength is directly proportional to the overlap L between the liquid 114 and the core 103 of the fiber. Therefore, by varying the overlap of the liquid 114 with the exposed core 103 and Bragg grating 104, the amplitude of various wavelenghts propagating through the fiber 101 can be altered, or tuned. This same principle can be applied with equally advantageous results to long-period gratings, planar waveguides, and other optical devices.

Tunable optical devices which operate in accordance with the principles of the present invention, as discussed above, can be advantageously made by using electrowetting principles. The resulting devices consume little power (e.g., <1 milliwatt in some cases), are latchable in operation (i.e., the fluid remains in a given position when the power is turned off), are relatively inexpensive to produce, and are compatible with conventional optical fibers.

Electrowetting principles (i.e., using electric fields to variably change the properties of a liquid-based device) have previously been used to change the focal length and position of liquid microlenses. Such electrowetting based microlenses are the subject of copending U.S. patent application Ser. No. 10/135973, entitled "Method and Apparatus for Aligning a Photo-Tunable Microlens" and copending U.S. patent application Ser. No. 10/1391 24, entitled "Method and Apparatus for Calibrating a Tunable Microlens," both of which are hereby incorporated by reference herein. In their simplest form, electrowetting based microlenses use a transparent droplet of liquid to focus incoming light onto a desired focal spot.

Figure 2:
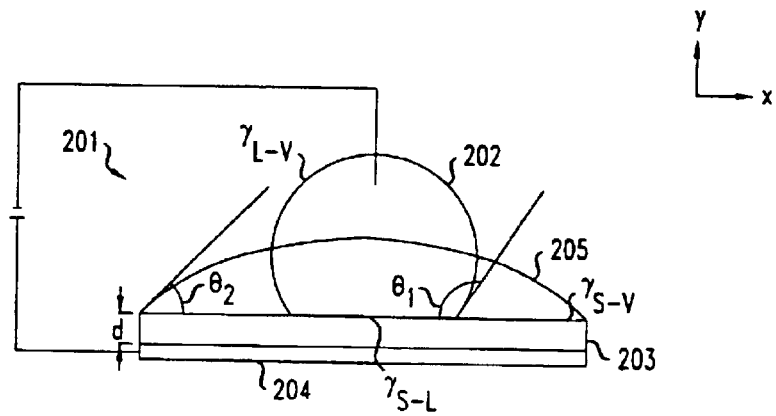
FIG. 2 shows cross-section view of a prior art electro-wetting based liquid microlens.

FIG. 2 shows one prior art embodiment of a simple liquid microlens 201, described in the '973 and '124 U.S. patent applications referenced above, whereby the phenomenon of electrowetting may be used to reversibly change the contact angle θ between a droplet 202 of a conducting liquid (which may or may not be transparent) and a dielectric insulating layer 203 having a thickness "d" and a dielectric constant $\epsilon_r$. The contact angle θ between the droplet and the insulating layer is determined by interfacial surface tensions (also known as interfacial energy) "γ", generally measured in milli-Newtons per meter (mN/m). As used herein, $\gamma_{S-V}$ is the interfacial tension between the insulating layer 203 and the air, gas or other liquid that surrounds the droplet, $\gamma_{L-V}$ is the interfacial tension between the droplet 202 and the air, gas or other liquid that surrounds the droplet, and $\gamma_{S-L}$ is the interfacial tension between the insulating layer 103 and the droplet 202. The contact angle θ may is determined by the following relationship:

$$\cos\theta = \frac{\gamma_{S-V} - \gamma_{S-L}}{\gamma_{L-V}} \quad \text{(Equation 2)}$$

An electrode 204, such as metal electrode is positioned below the dielectric layer 203 and is insulated from the droplet 202 by that layer. The droplet 202 may be, for example, a water droplet, and the dielectric insulating layer 203 may be, for example, a Teflon/Parylene surface.

When no voltage difference is present between the droplet 202 and the electrode 204, the droplet 202 maintains its shape defined by the volume of the droplet and contact angle $\theta_1$, where $\theta_1$ is determined by the interfacial tensions γ as explained above. When a voltage V is applied to the electrode 204, the voltage difference between the electrode 204 and the droplet 202 causes the droplet to spread. The dashed line 205 illustrates that the droplet 202 spreads equally across the layer 203 from its central position relative to the electrode 204. Specifically, the contact angle θ decreases from $\theta_1$ to $\theta_2$ when the voltage is applied between the electrode 204 and the droplet 202. The voltage V necessary to achieve this spreading may range from several volts to several hundred volts. The amount of spreading, i.e., as determined by the difference between $\theta_1$ and $\theta_2$, is a function of the applied voltage V. The contact angle $\theta_2$ can be determined by the following relationship:

$$\cos\theta_2(V) = \cos\theta_1(V=0) + \frac{\varepsilon_o \varepsilon_r}{2d\gamma_{L-V}} V^2 \quad \text{(Equation 3)}$$

where $\theta_1$ is the contact angle between the insulating layer 203 and the droplet 202 when no voltage is applied between the droplet 202 and electrode 204; $\gamma_{L-V}$ is the droplet interfacial tension described above; $\varepsilon_r$ is the dielectric constant of the insulating layer 203; and $\varepsilon_0$ is $8.85 \times 10^{-12}$ F/M—the permittivity of a vacuum.

Figure 3:
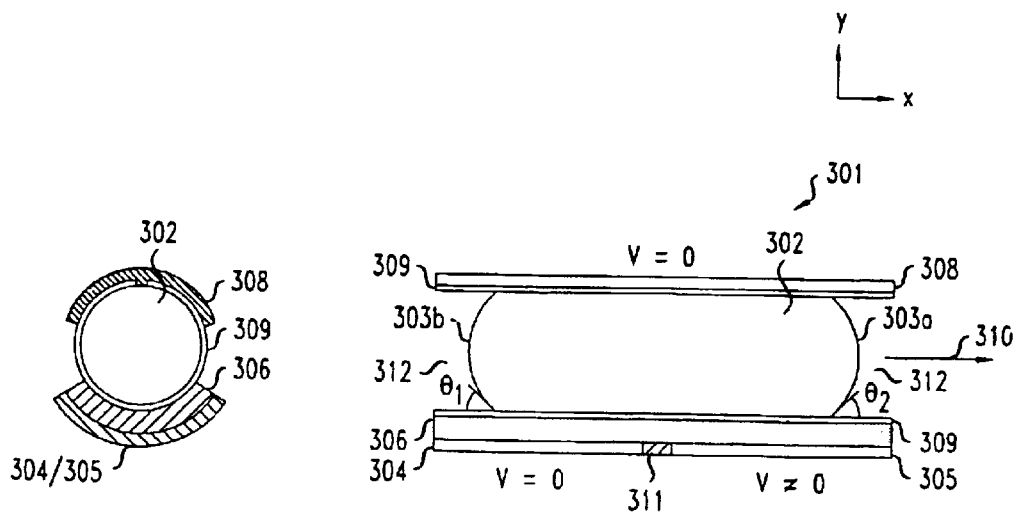
FIG. 3 shows a cross-section view of an optical device of the present invention wherein an optical fiber with a grating is disposed within a liquid filled enclosure.

FIG. 3 shows an embodiment of a structure 301 in accordance with the principles of the present invention that relies on the electrowetting principles described above to move a droplet of conductive fluid 302 through an enclosure 309 that is, for example, a glass tube of circular cross section with 1 mm thick walls. It will be obvious to one skilled in the art that there are many other enclosures that will accomplish the same function such as, for example, a tube with a square or rectangular cross section or, alternatively, two rigid substrates disposed parallel to each other with no sidewalls. In contrast to FIG. 2, the embodiment of FIG. 3 uses a second rigid substrate on top of a conducting liquid droplet 302 to entirely constrain the movement of the droplet in all directions except for the x-direction. Droplet 302 is, for example, a droplet of aqueous sodium dichromate ($Na_2Cr_2O_7 \cdot 2H_2O$), which is advantageous due to the fact that the concentration of sodium dichromate within the solution may be varied (tuned) in order to achieve a refractive index approximately that of a traditional optical fiber cladding. One skilled in the art will recognize that there are equally advantageous fluids that may be used with equally advantageous refractive indices. A low viscosity, low surface energy lubricating liquid 312 (such as, for example a polydimethylsiloxane, DMS-TOO, manufactured by Gelest, Inc.) surrounds the droplet of conducting liquid to facilitate movement of the droplet. This liquid 312 is immiscible with the aqueous sodium dichromate droplet. A dielectric insulating layer 306 is disposed on a first surface of enclosure 309 and serves to separate two electrodes, 304 and 305 respectively, from the surface of enclosure 309. The dielectric layer is, for example, a 6 μm thick layer of polyimide. Electrodes 304 and 305 are separated from each other by a dielectric spacer 311 (such as, e.g., a spacer made from Teflon or, alternatively, simply a gap between the electrodes). A third unpatterned ground electrode 308 is disposed on another portion of the outer surface of enclosure 309 such that it is not in contact with either electrodes 304 or 305. The inner surface of the portion of enclosure 309 corresponding to dielectric layer 306 may be coated with a thin film of low surface energy fluoropolymer (such as, e.g., a~2 μm thick layer of Cytop obtained from Asahi Glass). In addition, the inner surface of the portion of enclosure 309 corresponding to electrode 308 may be coated with, for example, a ~50 nm thick layer of this fluoropolymer, which is thin enough that it does not provide electrical isolation.

Figure 4A:
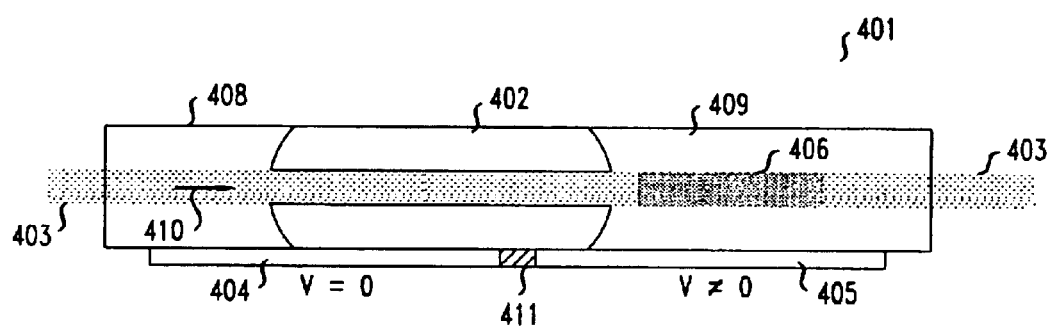
FIG. 4A shows the device of FIG. 2 wherein a fiber is contained within the liquid-filled enclosure.
Figure 4B:
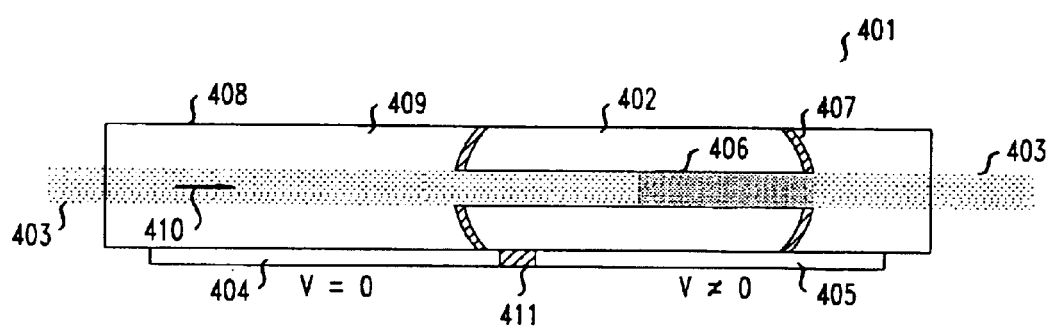
FIG. 4B shows the device of FIG. 4A wherein a the liquid is moved over a Bragg grating by varying the voltages on electrodes in proximity to the droplet.

Electrowetting principles, such as those above, are used to reversibly change the contact angle θ between the liquid and the surface of enclosure 309. The contact angle θ between the droplet and the insulating layer is, once again, determined by interfacial surface tensions and can be calculated by referring to Equation 2. When no voltage difference is present between the droplet 302 and the electrode 305, the droplet 302 maintains its position within the enclosure 309 with contact angle $\theta_1 = \theta_2$ where $\theta_1$ is determined by the interfacial tensions γ as explained above. When a voltage V is applied to the electrode 305, the voltage difference between the electrode 305 and the droplet 302 causes the droplet to attempt to spread, as in the case represented by FIG. 2. Specifically, the contact angle where boundary 303A meets the surface of enclosure 309 increases from $\theta_1$ to $\theta_2$ when the voltage is applied between the electrode 305 and the droplet 302. The voltage V necessary to achieve this change may range from several volts to several hundred volts. The amount of movement, i.e., as determined by the difference between $\theta_1$ and $\theta_2$, is a function of the applied voltage V. The contact angle $\theta_2$ can be determined by, once again, referring to Equation 3, where $\theta_1$ is the contact angle between the surface of enclosure 309 and the droplet 302 when no voltage is applied between the droplet 302 and electrode 305; $\gamma_{L-V}$ is the droplet interfacial tension; $\varepsilon_r$ is the dielectric constant of the insulating layer 306; and $\varepsilon_0$ is $8.85 \times 10^{-12}$ F/M—the permittivity of a vacuum. Since the droplet of FIG. 3 is constrained in its movement in all directions except the x-direction, a difference in contact angle caused by the applied voltage V leads to a force imbalance between the opposite sides 303A and 303B of the fluid droplet. As a result, the fluid droplet moves in direction 310 toward the side of the droplet under higher applied voltage FIGS. 4A and 4B show a schematic cross section of a structure 401 (such as a glass tube or other suitable structure) that controls fluid motion via electrowetting principles as described above. In this embodiment, referring to FIG. 4A, an optical fiber 403 is disposed within the structure 401 in a way such that the movement of a droplet of conducting liquid (such as an aqueous solution of sodium dichromate) 402 varies the optical properties of the fiber 403. The application of a voltage bias between the two underlying electrodes 404 and 405, respectfully, and the droplet 402 leads to a contact angle change that drives the droplet of conducting fluid 402 in direction 410 into increased overlap with the electrode 405 with a higher voltage. Referring to FIG. 4B, the resulting overlap of the fluid with a predefined "active" section 406 of fiber 403, such as, for example, a Bragg grating or a long-period grating, alters the fiber's transmission properties, as described below. The diameter of fiber 403 is small compared to the spacer 411 thickness and fluid channel width, and the contact of the fiber with the fluid does not significantly change the relevant flow behaviors of the conducting liquid.

Figure 5:
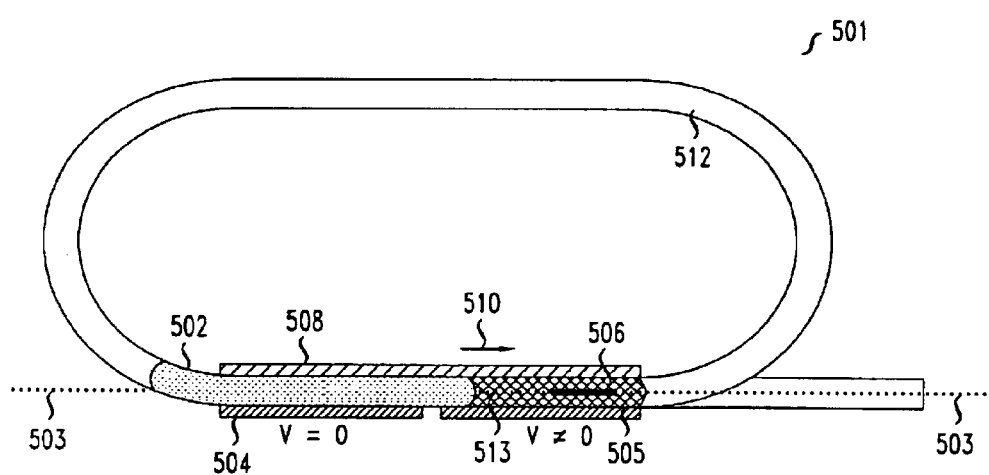
FIG. 5 shows a recirculating pump of one embodiment of the present invention wherein a liquid droplet is capable of being reversibly moved over a grating by varying the voltages on electrodes in proximity to the droplet.

FIG. 5 shows a cross-sectional view of one embodiment of a recirculating pump 501 in accordance with the principles of the present invention as described above. A droplet of conductive fluid 502 (e.g., aqueous sodium dichromate) is constrained to a recirculating channel 512. The oval part of the channel 512 is completely filled with fluid of which a small segment is the droplet of conducting liquid 502 and the remainder is lubricant 509 (of, e.g., polydimethylsiloxane), as described above. An optical fiber 503 with an active region 506 (for example a Bragg grating) is positioned within a part of the channel 512. The optical fiber 503 is, illustratively, a conventional single mode fiber for 1.5 micrometer wavelengths with, for example, a core diameter of ~8 micrometers, a cladding diameter ~125 micrometers, and a refractive index ratio $\varepsilon n = (n_{core} - n_{clad})/n_{core} \sim 0.4\%$. Electrodes 504, 505 and 508 are patterned so that there is no voltage across electrodes 504 and 508 (and hence there is no voltage across the droplet of conducting liquid). When a voltage of V≠0 is passed across electrode 505, the motion of the conductive droplet 502 in direction 510 from electrode 504 to electrode 505 leads to overlap (represented by cross-hatched area 513) with the active fiber segment 506. The recirculating geometry of the channel 512 ensures that the motion of the droplet of conducting liquid 502 does not lead to any resistive back-pressure. The velocity of the droplet is defined by the relationship:

$$v_{Liquid} \propto \frac{\varepsilon_o \varepsilon_r D V^2}{\eta d L} \quad \text{(Equation 4)}$$

where η is the viscosity of the conducting fluid, D is the channel cross-sectional dimension, and L is the length of the "racetrack" segment over which the droplet of conducting liquid moves.

Figure 6:
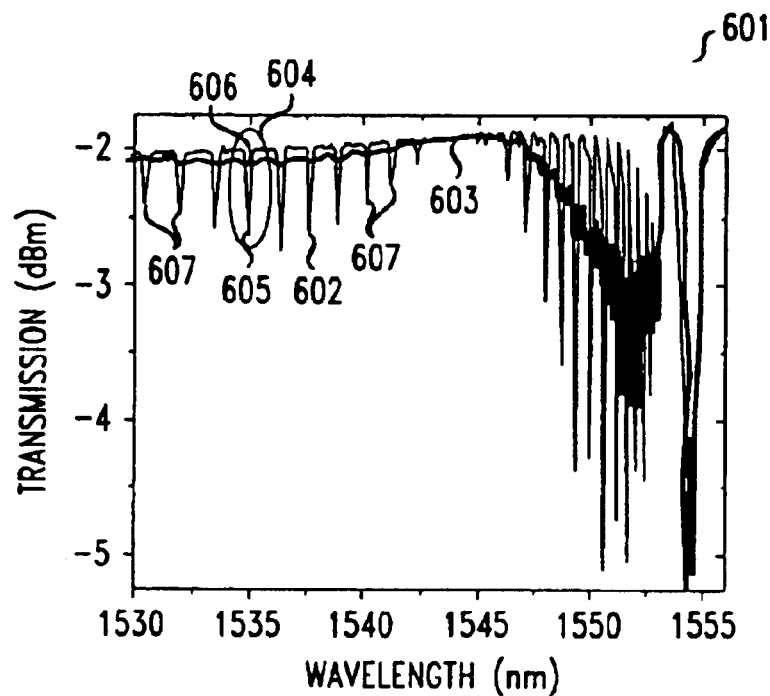
FIG. 6 shows an illustrative graph of the fiber transmission characteristics of the recirculating pump of FIG. 5.

FIG. 6 shows an illustrative graph 601 of the fiber transmission characteristics of the recirculating pump of FIG. 5 wherein the active region 506 of the optical fiber 503 is a ~2 cm long fiber Bragg grating. Plot 602 represents the transmission of different wavelengths through the fiber when air is the medium surrounding the grating. In contrast, plot 603 shows the transmission of those same wavelengths when a conducting droplet of liquid (e.g., aqueous sodium dichromate) entirely overlaps the grating. A fiber Bragg grating exhibits mode resonance in the cladding and, therefore, the transmitted amplitude of certain wavelengths where such resonance occurs is significantly reduced. These reductions in signal amplitude are represented by the resonance "spikes," such as spikes 607 of plot 602. However, the transmission characteristics of the fiber are significantly altered by varying the index of refraction of the surrounding medium. As such, as shown in plot 603 relative to plot 602, the cladding mode loss resonances, represented by the spikes 607 in plot 602, can be significantly suppressed when the droplet of conducting fluid 502 in FIG. 5, as opposed to air, is the medium surrounding the Bragg grating 506. As a result, the transmission amplitude losses shown in plot 602 when air surrounds the grating are suppressed when the droplet of fluid 502 surrounds the grating.

Figure 7:
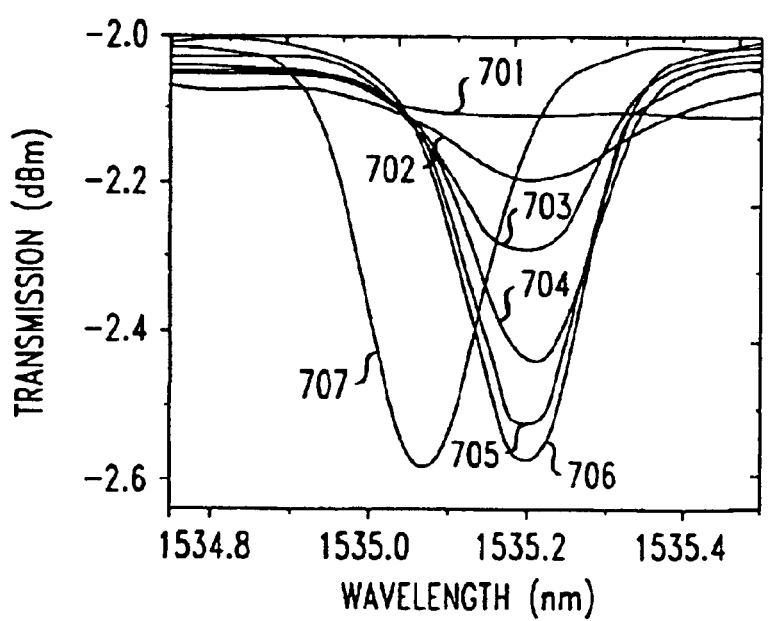
FIG. 7 shows the variation of signal amplitude for varying amounts of overlap of the liquid droplet of FIG. 5 with a ~2 cm long fiber Bragg grating.

FIG. 7 shows the variation of signal amplitude for varying amounts of overlap of an aqueous sodium dichromate liquid droplet with a ~2 cm long fiber Bragg grating. Since the refractive index of refraction of the sodium dichromate solution is tuned to be approximately equivalent to that of a silica cladding, this overlap effectively shortens the length of the Bragg grating. Plot 707 shows a close-up view of area 604 in FIG. 6 and, in particular, of the resonance spike 605 in FIG. 6 that results when air is the medium surrounding the Bragg grating. Plots 701 through 706 in FIG. 7 show the resonance spikes that result for varying amounts of overlap of the liquid droplet with the grating, with plot 706 being minimal overlap and plot 701 representing the case of full overlap. Plot 701 corresponds to the portion 606 (in FIG. 6) of plot 603 that lies within area 604. These plots show that the signal amplitude for a particular signal wavelength passing through a Bragg grating can be variably tuned, for example, to variably filter amplitudes of certain wavelengths. While the filtering effect represented by FIG. 7 is small in terms of absolute attenuation adjustment (~0.5 dBm in the graph in FIG. 7), this limitation is due only to the inefficient cladding mode excitation obtained from the Bragg grating. Electrowetting-actuated tuning can be identically applied to long-period gratings to achieve filter tuning over larger dynamic ranges.

Figure 8:
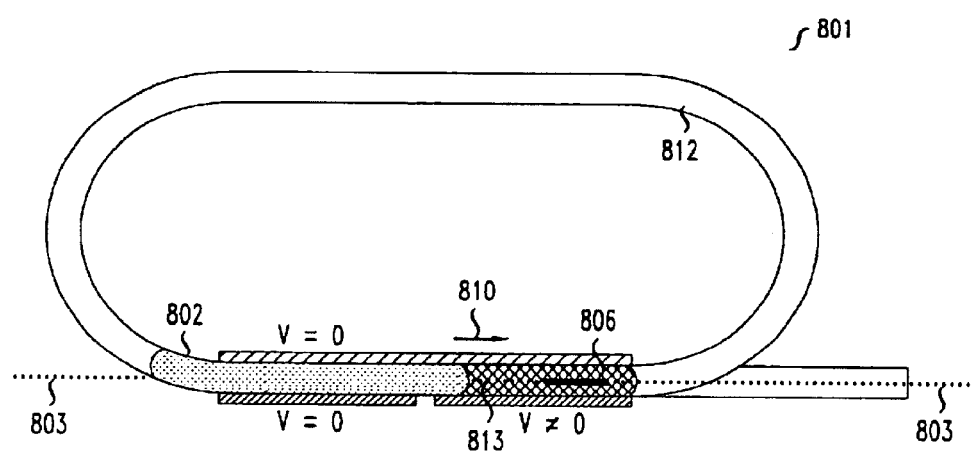
FIG. 8 shows a recirculating pump of one embodiment of the present invention wherein a liquid droplet is capable of being reversibly moved over an etched fiber by varying the voltages on electrodes in proximity to the droplet.

FIG. 8 shows an illustrative recirculating pump with a droplet 802 of conductive fluid (e.g., a droplet of aqueous sodium dichromate having a refractive index exceeding that of fiber 803) that is constrained to a recirculating channel 812. Once again, similar to the pump of FIG. 5, the oval part of the channel 812 is completely filled with fluid of which a small segment is the droplet 802 of conducting liquid, and the remainder is lubricant (of, e.g., polydimethylsiloxane), as described above. Optical fiber 803 having an active region 806 is positioned within a part of the channel 812. In this case, however, in contrast to the fiber of FIG. 5, the region 806 of fiber 803 is etched with hydrofluoric acid to a diameter of ~15 micrometers over a 5 mm length. As the fluid droplet 802 moves in direction 810 to position 813 and, thus, overlaps with the etched region 806 of the fiber, it causes specific wavelengths of light, dependent upon the period of the grating, to irreversibly couple out of the core. The strength of the attenuation that is associated with this coupling is directly proportional to the extent of overlap of the fluid droplet 802 with the etched region 806 of the fiber and can achieve a 40 dBm or greater reduction in the transmitted amplitude across a wide wavelength spectrum.

Figure 9:
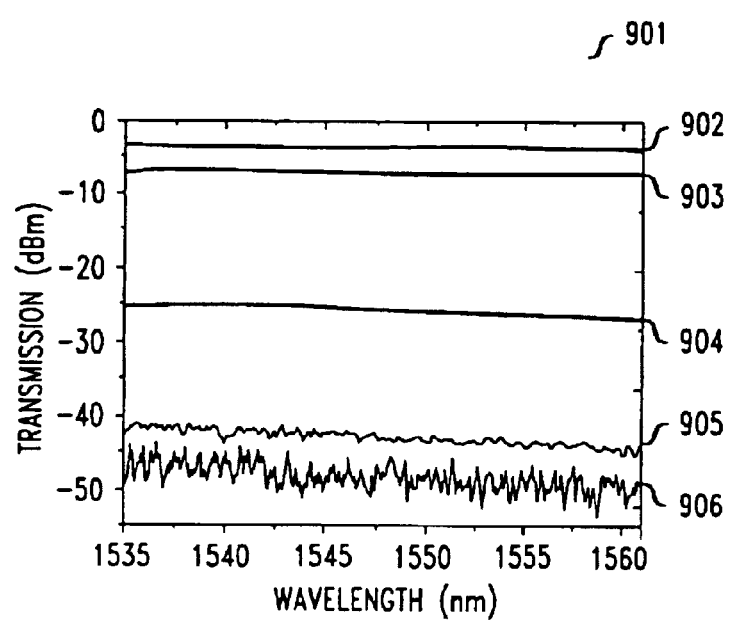
FIG. 9 shows an illustrative graph representing the attenuation of a transmitted signal that results from various amounts of overlap of the droplet of FIG. 8 with the long-period grating of FIG. 8.

FIG. 9 is an illustrative graph 901 representing various amounts of overlap of the droplet 802 in FIG. 8 with the active region 806 of fiber 803 in FIG. 8. Line 902 shows the amplitude of wavelengths between 1535 and 1560 nanometers transmitted through the fiber when there is no overlap between the droplet 802 in FIG. 8 and the etched fiber segment 806. While line 902 shows an approximate 2–3 dBm loss, even though the droplet does not overlap with the etched segment, this loss can be largely attributed to the connections used in connecting the fiber 803 in FIG. 8 to the light source and/or to other components (e.g., a spectrum analyzer). One skilled in the art will recognize that the use of low loss fusion fiber splices can reduce insertion losses to <0.1 dB. Lines 903, 904, 905 and 906 represent respective increases in the overlap of the fluid droplet 802 with region 806 in FIG. 8 until, as represented by line 906, an overlap of approximately 2 mm is obtained between the droplet 802 and region 806 in FIG. 8. Thus, line 906 shows that a greater than 40 dBm reduction in transmitted amplitude over a broad wavelength range may be achieved by increasing the overlap of the droplet with the active region of the fiber.

Figure 10:
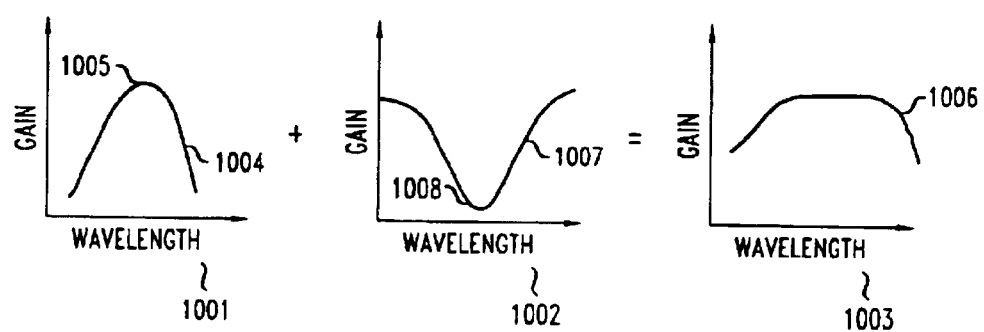
FIG. 10 shows an example of using the attenuation resulting from a long-period grating to equalize the output from an erbium doped fiber amplifier.
Figure 11:
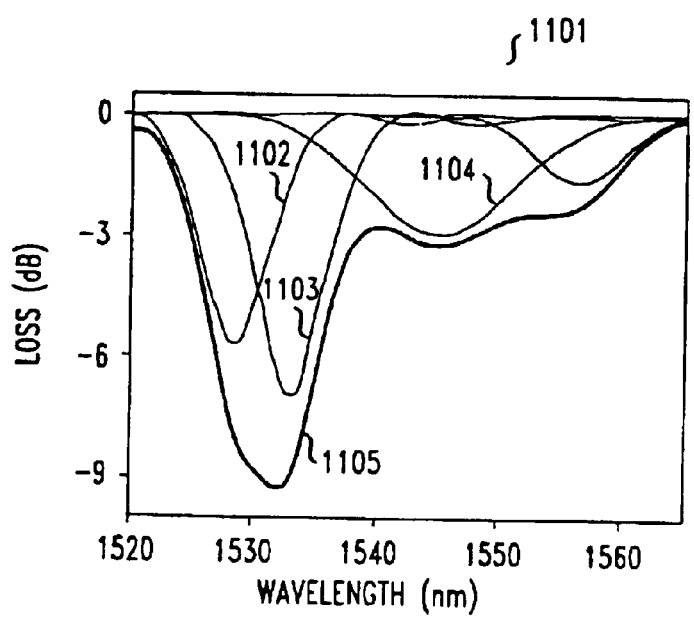
FIG. 11 shows another example of using the attenuation resulting from multiple long-period gratings to equalize the output from an erbium doped fiber amplifier.

FIGS. 10 and 11 represent the transmission characteristics of one potential use of the tunable fiber devices described herein in photonic systems, exemplarily a dynamic gain equalizer for an erbium doped fiber amplifier (EDFA). One skilled in the art will recognize that there are many other potential uses of these devices. Referring to FIG. 10, graph 1001 shows a simple representative gain profile 1004 of a particular EDFA as a function of wavelength. As is typical, profile 1004 shows a relatively narrow peak 1005 about a particular wavelength. One skilled in the art will recognize that it is often desirable to have an EDFA profile, such as profile 1006 in graph 1003, with a relatively constant peak over a broader range of wavelengths. Graph 1002 represents a tunable fiber device (such as the aforementioned device combining the etched fiber 101 of FIGS. 1B and 1C with the pump 501 of FIG. 5) where the grating is a long-period grating embodying the above described principles. The shape of the gain (attenuation) profile 1007 exhibits a maximum attenuation profile at peak 1008. Transmitting the signal from the EDFA with gain profile 1004 through the fiber and the long-period grating with attenuation profile 1007, results in profile 1006 with a relatively broad, constant amplitude over a relatively wide range of wavelengths.

While FIG. 10 shows a simple example of altering the gain profile output from an EDFA, in real-world applications, the gain profile of such an amplifier is more complex and, thus, it is usually not possible to use one grating to achieve the desired gain profile. Thus, FIG. 11 shows a representative graph 1101 illustrating how a more complex signal profile from an EDFA may be attenuated to provide the broader, constant gain profile represented by profile 1003 in FIG. 10. Specifically, a relatively complex attenuation profile 1105 can be achieved by incorporating multiple tunable long-period gratings into an equalizer. Lines 1102, 1103 and 1104 each represent individual attenuation profiles of individual tunable gratings that, when used in conjunction with one another, produce the overall attenuation profile 1105. Any number of such gratings can be used to create attenuation profiles of varying complexity to achieve the desired EDFA gain profile.

The foregoing merely illustrates the principles of the invention. It will thus be appreciated that those skilled in the art will be able to devise various arrangements which, although not explicitly described or shown herein, embody the principles of the invention and are within its spirit and scope. Furthermore, all examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

We claim:

1. Apparatus comprising:
   an optical fiber having a core with a first refractive index; and
   an enclosure containing a region of fluid with a second refractive index surrounding a segment of the optical fiber;
   wherein a first portion of said fiber is cladded and a second portion of said fiber is uncladded, and
   wherein said region of fluid is controllably movable within said enclosure.

2. The apparatus of claim 1 wherein said fluid is movable from said first portion of said fiber to said second portion of said fiber.

3. The apparatus of claim 1 wherein said second portion comprises a grating.

4. Apparatus comprising:
   an optical fiber;
   an enclosure surrounding a portion of said optical fiber,
   wherein at least one property of the optical fiber is modifiable by controllably moving a region of fluid within said enclosure, and
   wherein said portion of said optical waveguide further comprises a first section that is cladded and a second section that is uncladded.

5. The apparatus of claim 4 wherein said at least one property is the effective refractive index.

6. A method for modifying the effective refractive index of an optical fiber, wherein at least one segment of said length of optical fiber is enclosed within an enclosure, said method comprising:
   controllably moving a region of fluid within said enclosure in a way such that it covers at least a portion of said segment of optical fiber,
   wherein a first portion of said segment of said optical fiber is cladded and a second portion of said segment of said optical fiber is uncladded.

7. The method of claim 6 wherein said region of fluid moves in a way such that it at least partially overlaps said second portion of said segment of said optical fiber.

* * * * *